Patented Oct. 10, 1933

1,930,437

UNITED STATES PATENT OFFICE 1,930,437

METHOD OF COMPOUNDING OIL-RESISTANT RUBBER STOCK AND PRODUCT MADE THEREBY

David J. Beaver, Elizabeth, N. J., assignor, by mesne assignments, to Doherty Research Company, New York, N. Y., a company of Delaware No Drawing. Application February 27, 1931
Serial No. 518,905

3 Claims. (Cl. 106—23)

This invention relates to the production of rubber compounds, and more particularly it concerns such compounds having a high resistance to oil, steam and similar materials that are deleterious to rubber.

The oil industry has always been a large consumer of mechanical rubber goods designed by composition and method of manufacture to withstand the destructive effect of constant contact with oil and oily substances, steam and rough usage. It has been necessary to specially compound rubber goods that are intended for service in the oil industry such as for power transmission belting, swab rubbers, valve rings and inserts, and hose for handling oil and gasoline. The rubber stocks to be used for these services should also have in addition to a high degree of oil resistance other desirable physical properties including a high tensile strength, suitable flexibility, and resistance to abrasion.

It has been customary in the past to prepare such stocks by mixing or diluting the rubber with filling materials insoluble in oil. Among the fillers commonly used may be noted clay, whiting, zinc oxide, barytes and lithopone. A great handicap in the use of the pigments and compounding ingredients mentioned has been due to the serious deterioration in the tensile and other physical properties of the rubber compound where sufficient amounts of these ingredients have been employed to produce a compound having satisfactory oil resistant properties. The tensile strengths of the cured compounds were low and they also had very poor aging properties and lacked the necessary flexibility needed to adapt them for use in gasoline and oil hose and the like.

Other attempts in the past to produce oil-resistant rubber stocks in which were used reclaimed rubber, sulfur and glue separately or together for imparting oil resistance, yielded similar though somewhat improved results. Glue itself being water-soluble, has proven to be much less effective for imparting oil resistance to a rubber stock than had been forecast for it.

The remarkable ability of carbon black to protect rubber from the destructive effect of oil is now well known. The carbon blacks heretofore employed have been of the usual type available upon the market, known as reinforcing blacks, and employed in large quantities in the rubber industry. Such carbon blacks, known as channel black, are produced by a process involving the partial combustion of gaseous or vaporized hydrocarbon according to which the carbon black-containing gases are impinged while at high temperatures on metal channels or their equivalent. Such carbon blacks have been able to replace a considerable portion of the inorganic fillers for use in the manufacture of oil-resistant rubber stocks. The extent of its utilization, however, has been seriously limited in the past due to the fact that carbon black made by the well-known channel process when used even in amounts as much as 50 parts by weight to 100 parts of rubber, always gives to rubber stocks with which it is compounded a noteworthy stiffness or boardiness which is highly undesirable in stocks that are to be employed in the industry for purposes where flexibility also is desired as for example in the manufacture of oil and gasoline hose, rotary drilling hose, power transmission belting and the like. It is true that the percentage of channel black which may be satisfactorily introduced into the stock can be somewhat increased by the addition to the compounding ingredients of relatively large proportions of plasticizers such as stearic acid and other softening materials of an oily nature. Since however these last-named substances seriously reduce the oil resistance of the stock, their use defeats in a measure the purpose for which the carbon black is employed.

The discovery has now been made that soft carbon blacks—while having the ability to impart to rubber compounds containing them the same desirable physical properties including oil resistance rendered by a channel black, have the further property not possessed by channel blacks of imparting to such compounds after cure a noteworthy degree of flexibility, even when such carbon blacks are used in much larger proportions than would be possible in the case of channel blacks. Furthermore, the soft carbon black is of a character which can be milled in with rubber in much larger amounts than is possible in the case of channel black due to the very strong tendency of the latter to stiffen the rubber, making it unworkable on the rubber mills.

The term "soft carbon black" as here employed in the specification and claims is intended as a generic term to designate all carbon blacks which, when compounded with rubber and the usual vulcanizing agents in the proportions by weight of 100 parts of rubber, 40 parts of the carbon black, 3 parts ZnO, 3 parts sulphur and 1 part accelerator, imparts to the rubber compound, after vulcanization, a resilient energy of 75% or more of that possessed by a vulcanized mixture of ZnO, the rubber, the vulcanizing agent and accelerator alone. Such resilient energy of the rubber compound is measured by the extent of rebound of a round ball of the vulcanized compound 1.75 in. in diameter freely falling from a given height. Such soft carbon blacks may be produced by the partial combustion of gaseous and vaporized hydrocarbon within a heated enclosed space, out of contact with solid walls. In fact insofar as applicant is aware after extensive research, they may be produced by any process other than the channel black process or any modification thereof, such as the roller process and the disc process, in which the hot carbon black containing gases impinge upon cold solid surfaces.

It has now been determined that by the employment of soft carbon blacks in oil-resistant rubber stocks, not only is a large degree of resistance to deterioration of the stocks by oil effected, but in addition thereto such stocks have high tensile strengths, good aging properties high degrees of flexibility, and excellent resistance to abrasion. Highly satisfactory oil resistant stocks have been produced in which soft carbon black has been milled into the rubber in amounts up to as high as 137 parts per 100 parts of rubber without any difficulty in processing.

The following formulæ exemplify various applications of the invention in the production of highly oil resistant rubber stocks having satisfactory physical properties adapting them for general service in the oil industry and allied industries.

*Example 1.*—A rubber compound was made using the following formula:

| | Parts by weight |
|---|---|
| Smoked sheet | 100 |
| 20% Master batch (containing 80% of smoked sheet) and aniline-butyl aldehyde condensation product accelerator | 21.1 |
| Sulfur | 13.2 |
| Clay | 131.5 |
| Whiting | 42.2 |
| Zinc oxide | 26.3 |
| Litharge | 10.5 |
| Palm oil | 5.3 |
| Soft carbon black | 100 |

The above-mentioned stock, after 45 minutes cure at 140° C., had an ultimate tensile strength of 1200 lbs. per sq. in. After immersion in turpentine for two days at room temperature it had a turpentine absorption less than three-quarters of that of a somewhat similar compound in present day commercial use in which there was employed in place of the soft carbon black,—180 parts of a 50% glue-rubber master batch.

*Example 2.*—A rubber stock was compounded according to the following formula:

| | Parts by weight |
|---|---|
| Smoked sheet | 100 |
| Whiting | 100 |
| Zinc oxide | 5 |
| Stearic acid | 2 |
| Sulfur | 10 |
| Aniline-butyl aldehyde condensation product | 3.5 |
| Soft carbon black | 90 |

The amount of soft carbon black employed is equivalent to 46.5 volumes per 100 volumes of rubber, and was produced by a process involving the partial oxidation of natural gas within an enclosed space, out of contact with solid surfaces until a substantial cooling of the carbon black had been effected. This rubber stock, unaged and after 45 minutes cure at 140° C., had a tensile strength of 1450 lbs. per sq. inch at 110% elongation. It had an oil resistance (based on the percent increase in volume induced by a 72 hours immersion in gasoline at 70° C.), 25% greater than the oil resistance of a corresponding stock in which an equivalent amount of glue had been substituted for the soft carbon black.

A compound similar to that set out in Example 2 but in which 120 parts by weight of soft carbon black was employed, corresponding to 62 volumes of soft carbon black per 100 volumes of rubber, yielded under similar conditions a rubber stock having approximately the same tensile strength and a still lower oil absorption than where 90 parts of the black were used. Similarly, stocks containing amounts of soft black by weight varying from 38 to 137 parts by weight of soft black to 100 parts of rubber possess satisfactory oil-resistant properties together with the other desired physical properties adapting them for the various purposes heretofore mentioned.

It will be understood that it is not essential in the production of an oil-resistant rubber stock within the scope of the present invention, that the particular compounding ingredients mentioned in the above mentioned examples be employed; nor is it essential that those selected be used in the precise amounts mentioned. For example the amount of sulfur employed in the stock of the above Example 2 may be varied within reasonable limits without deleteriously affecting the physical properties of the vulcanized compound; including the oil absorption.

A stock containing 100 parts by weight of smoked sheet, 137 parts soft carbon black, 5 parts ZnO, 2 parts stearic acid, 6 parts sulphur, and 3.5 butene, yielded upon vulcanization at 140° C. for 45 minutes, a product having an oil resistance approximately 50% higher than similar stocks in which part of the soft carbon black was replaced respectively with glue, and with factice. The tensile of the stock containing 137 parts of soft carbon black was about 33⅓% higher than those of the other stocks mentioned.

It will be noted in the examples given that the amount of softener,—stearic acid,—employed is in the neighborhood of 2% or less of the total weight of the stock. This is one of the important features of the present invention, made possible by the use of soft carbon blacks in large proportions, which soft blacks do not impart to rubber stocks the high degree of stiffness that makes necessary the employment in these stocks of softeners which themselves act to reduce the oil resistance as well as the tensile and other physical properties of the stock. The presence of soft carbon black in the rubber stock in the proportions mentioned does not in any way interfere with the proper milling of the rubber and compound on the rubber mills, and this milling, therefore of course is effected without the need for plasticizers in the amounts in which they are required when employing like amounts of channel black.

Other accelerators in addition to that mentioned above may be employed, such as for example, the well known aniline-acetaldehyde condensation product. The oil resistance of rubber stocks compounded with a soft carbon black depends in considerable extent on the degree of vulcanization of such rubber stocks. Even a well compounded rubber will not satisfactorily resist the solvent action of oils and gasoline if undervulcanized. Serious overcure on the other hand leads to poor aging and to cracking of the rubber thus reducing its period of utility. When the accelerator is properly selected, vulcanization periods at 140° C. of as low as 15 minutes may sometimes be employed, although a time of cure of as long as 45 minutes or longer is preferred. It may be stated generally that a rubber stock in which a soft carbon black is employed as the principal medium for producing oil resistance has a substantially greater modulus than has the same stock in which a channel process carbon black replaces the soft carbon black; and that therefore it is possible to use much larger amounts of the reinforcing and oil-resistance—imparting soft carbon black than is possible in the case of channel process black, due to the practical impossibility of milling relatively large quantities of the latter into the rubber, and to the tendency in the latter instance towards the production of a hard boardy stock lacking the necessary softness and pliability required for rubber intended for use in the oil industry and related industries.

It is within the purview of the invention to employ,—in place of a soft carbon black alone as the ingredient imparting oil resistance to the stock,—a mixture containing a soft carbon black and a minor portion of channel black, the latter being used for the purpose of controlling the degree of resilience of the rubber stock after cure. Stocks containing as much as 5% of a softener such as stearic acid have satisfactory oil-resistance and tensile strengths, although it has been found preferable to employ such softeners in amounts of 2% or less of the stock.

The invention is susceptible of modification within the scope of the appended claims.

I claim:

1. In the process of manufacturing resilient, gasoline-resistant rubber stock, the step of controlling the degree of resilience of the said stock while avoiding loss of the oil-resistant property thereof, which comprises compounding with rubber a vulcanizing agent, an accelerator, and a mixture containing a soft carbon black of the type produced by the partial combustion of a hydrocarbon out of contact with solid surfaces, and a minor portion of channel black in proportions to form when vulcanized a gasoline-resistant product, and thereafter vulcanizing the said compound.

2. In the process of manufacturing a resilient, gasoline-resistant rubber stock, which comprises compounding with rubber and a vulcanizing agent, a soft carbon black, and less than 5% of a softener, and vulcanizing the resultant compound, the step for controlling the degree of resilience of the stock after cure which comprises mixing with the soft carbon black a portion of channel black prior to compounding the said black with rubber, for adjusting the resilience of the rubber stock after cure, the total carbon black being present in the rubber stock in amount sufficient to form when vulcanized a highly gasoline-resistant rubber stock.

3. In the process of manufacturing a resilient, gasoline-resistant rubber stock, which comprises compounding with rubber and a vulcanizing agent, a soft carbon black, and less than 5% of a softener, and vulcanizing the resultant compound, the step for controlling the degree of resilience of the stock after cure which comprises mixing with the said soft carbon black, a minor portion of channel black prior to compounding the carbon black with the rubber, the relative proportions of the soft carbon black, channel black and rubber forming a rubber stock which when vulcanized is gasoline-resistant.

4. In the process of manufacturing a resilient gasoline-resistant rubber stock suitable for use in mechanical goods employed in the oil industry, which process comprises compounding with 100 parts of rubber a vulcanizing agent, and 50 to around 137 parts by weight of a soft carbon black of the type produced by the partial combustion of a hydrocarbon within a heated, enclosed space out of contact with solid surfaces, and vulcanizing the resultant compound, the step of controlling the modulus of the cured stock which comprises substituting for a minor portion of the said soft carbon black an equivalent portion of channel process carbon black, the said soft carbon black and channel process carbon black being present in the stock in proportions to form upon vulcanization a gasoline-resistant product.

5. The process of manufacturing a highly gasoline-resistant resilient rubber stock adapted for use in the oil industry, which comprises compounding with 100 parts by weight of rubber, a vulcanizing agent, 50 to about 137 parts by weight of carbon black, and less than 5% of a softener, and vulcanizing the resultant compound, the said carbon black being composed in major part of a soft black of the type produced by the partial combustion of a hydrocarbon within a heated enclosed space out of contact with solid surfaces, together with a minor portion of channel process carbon black, the latter being present in amount sufficient to increase the modulus of the stock after cure.

6. A vulcanized highly gasoline-resistant, resilient rubber stock adapted for use in the oil industry, which comprises rubber, a vulcanizing agent, carbon black and less than 2% of a softener, the carbon black being present in amounts ranging from 50 to about 137 parts by weight to 100 parts of the rubber and consisting in major part of a soft black of the type produced by the partial combustion of a hydrocarbon within a heated enclosed space out of contact with solid surfaces, together with a minor portion of channel process carbon black.

7. The process of producing a resilient gasoline-resistant rubber stock which comprises vulcanizing a mixture containing rubber, a vulcanizing agent, and a soft carbon black produced by the partial combustion of a hydrocarbon within a heated, enclosed space out of contact with solid surfaces, the said carbon black being present in 80% or more by weight of the rubber content of the compound.

8. A vulcanized resilient gasoline-resistant rubber stock which comprises rubber, a vulcanizing agent, carbon black, and a plasticizer, the plasticizer being present in not substantially more than 2% of the total weight of the stock, and the carbon black being of the type produced by the partial combustion of a hydrocarbon within an enclosed space out of contact with solid surfaces, and being present in amount at least 50% of the weight of the rubber content of the stock.

DAVID J. BEAVER.